June 26, 1951 J. R. WOOD 2,558,029
CHRISTMAS TREE ILLUMINATION SYSTEM
Filed May 7, 1946 3 Sheets-Sheet 3
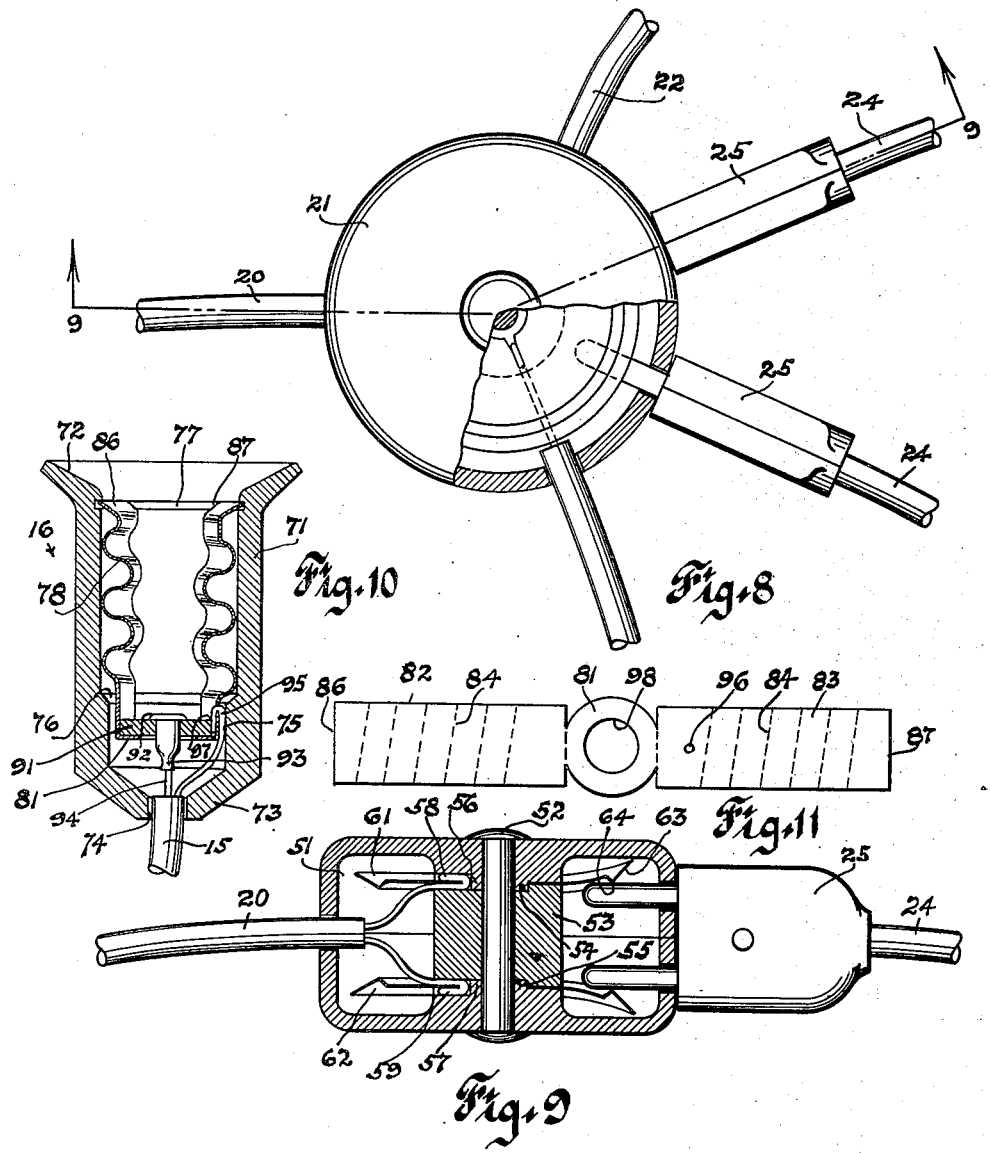

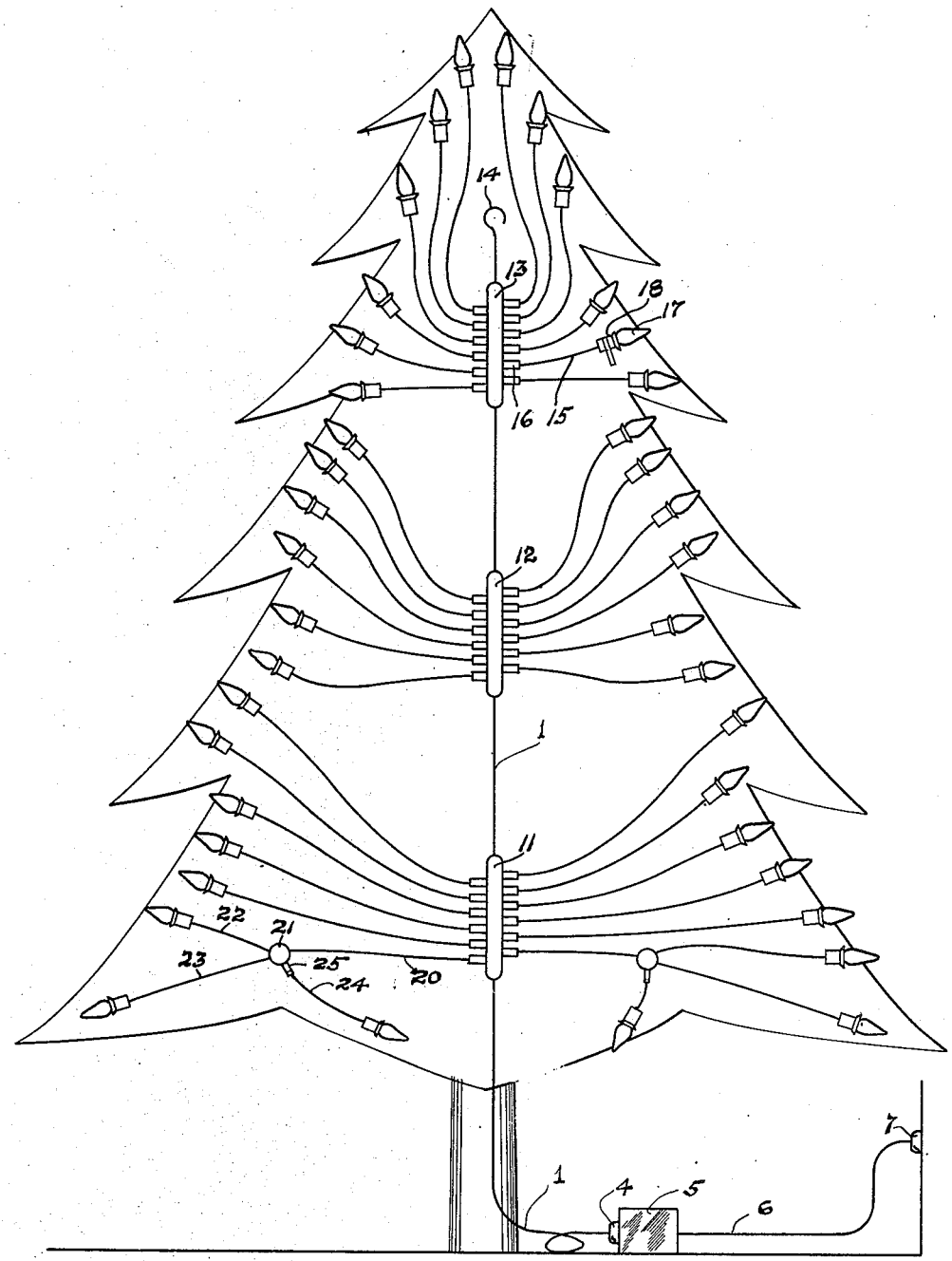

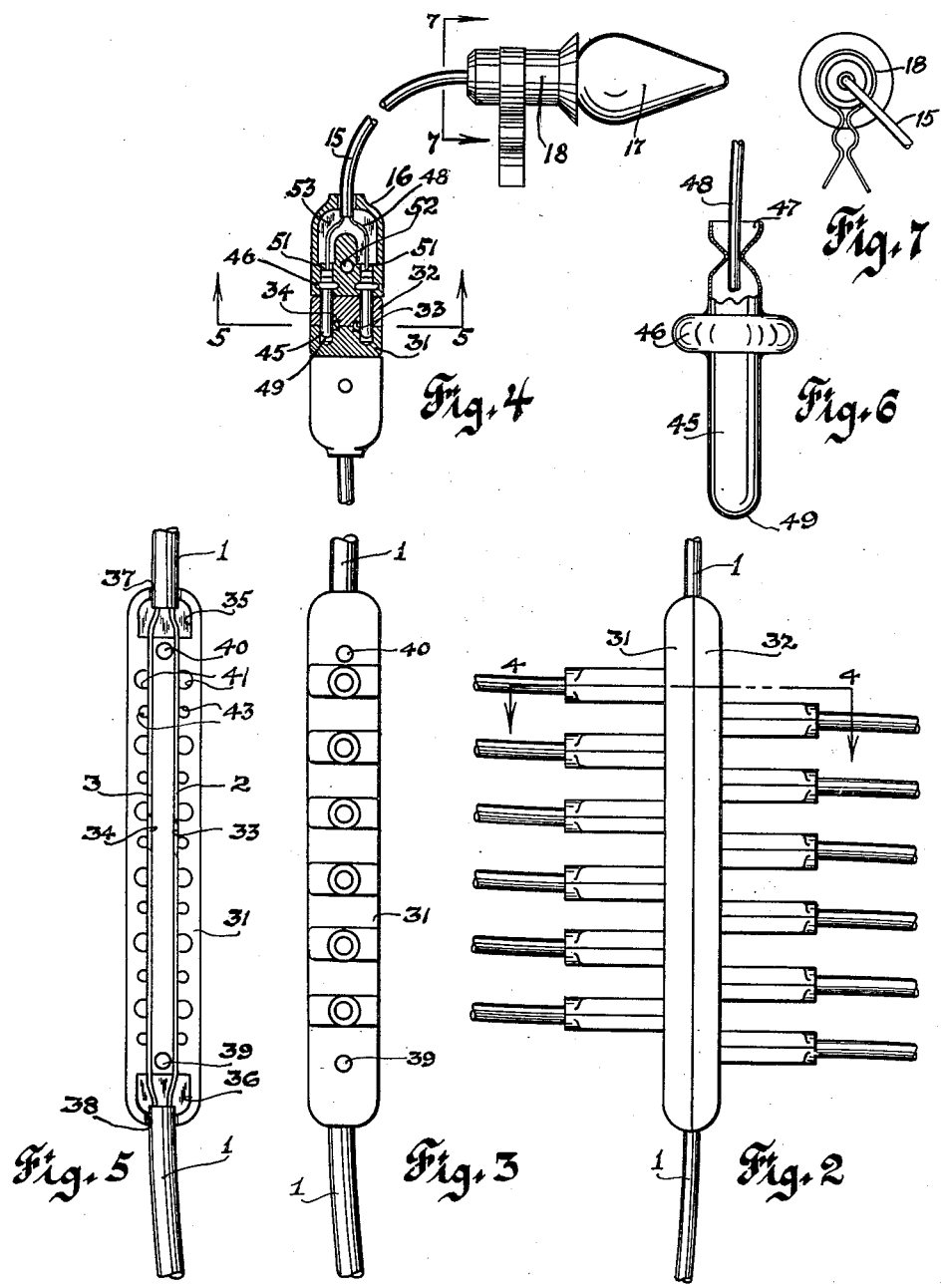

UNITED STATES PATENT OFFICE 2,558,029

CHRISTMAS TREE ILLUMINATION SYSTEM

John R. Wood, Lakewood, Ohio, assignor of one-third to John R. Wood, one-third to Thomas J. Wood, Sr., and one-third to Thomas J. Wood, Jr., joint trustees Application May 7, 1946, Serial No. 667,947

1 Claim. (Cl. 240—10)

This invention relates to a Christmas tree illumination system. More particularly, it comprises a Christmas tree illumination system having substantial features of construction, but designed for quantity production at low cost and without the use of solder. The invention has in view providing an illumination system of this character which will avoid the disadvantages of the systems at present in general use wherein the natural beauty of the tree is detracted from by the presence of numerous circuit wires leading from one branch of the Christmas tree to another to provide the various points of illumination around the circumference of the tree. In place of the use of a number of bulbs along a single line connected in series, the present invention has in view connecting each bulb by means of a double line of conductors to the current source, although it is also possible to utilize a string of bulbs in one or more selected sockets when illumination of that type is of advantage as in a cluster or group illumination for certain areas of the tree.

The invention includes the provision of a main circuit mounted directly against the trunk of the tree and providing a plurality of multiple plug sockets at spaced intervals along the trunk of the tree, and also providing branch connectors adapted to distribute the current to a group of bulbs located in the more heavily branched area of the tree.

The invention thus includes the conductor line leading to a source of current and having the multiple plug sockets at intervals along the main line. Each of the multiple plug sockets is formed to provide contacts directly with the conductor wires at each of the plug positions, thus obviating the use of solder. The branch connectors likewise are made of pairs of contact elements permitting the use of permanently attached branch lines or individual plug connections or combinations of individual plug connections and separate branch lines. The entire circuit thus is formed of a minimum number of parts and with the positioning of these parts relatively to each other such that rapid assembly may take place without the use of solder or similar fastening means, and the structure thus produced is adapted for long service life and is thoroughly dependable. In addition, the illumination system when applied to a Christmas tree is almost wholly concealed inasmuch as the conductors themselves, as well as the associated parts, may be made of relatively small dimensions and the tree will display the usual ornaments to great advantage since the numerous wires usually present are substantially completely concealed.

The principal object of the present invention is to provide a Christmas tree illumination system adapted for quantity production at low cost and having characteristics permitting concealment of the wires to a substantial degree without, however, sacrificing any requirements as to the quality of the construction and its full dependability.

Another object of the invention is to provide an illumination system for Christmas trees wherein a large number of plug sockets are provided at spaced intervals along a tree trunk so that installation of the main line may be made independently of the branch lines as a primary operation, and after the main line is in place along the tree trunk, the branch lines may be connected separately at suitable positions and installed progressively at such points as may be selected, thus providing for the shortest path for connection with the source of current and permitting substantial concealment of the conductors for the branch lines.

Another object of the invention is to provide multiple plug sockets at spaced intervals along the main line as permanent points of the main line for the illumination system, such sockets each being of simple construction involving a few parts and dispensing with the use of soldered connections.

Another object of the invention is to provide branch connectors adapted to be plugged into a multiple plug socket and to serve as distributing points.

Another object of the invention is to provide additional distributing points through the branch connectors which may have permanent lines as well as plug sockets so that the branch connectors may have the points of distribution increased, adapted to the particular requirements at the points of location of such branch connectors.

Another object of the invention is to provide individual miniature lamp circuits for plugging into the multiple plug socket units, each line having a novel type of solderless plug at one end and a solderless lamp socket at its opposite end.

Other and further objects of the invention will appear in the course of the following description.

To the accomplishment of the foregoing and related ends, said invention, then, consists of the means hereinafter fully described and particularly pointed out in the claim.

The annexed drawing and the following description set forth in detail certain structures embodying the invention, such disclosed means constituting, however, but several of various structural forms in which the principle of the invention may be used.

In said annexed drawings:

Figure 1 is a diagrammatic view showing a front elevation of a Christmas tree in outline with an illumination system applied thereto embodying the principle of the invention;

Figure 2 is a side elevation of a multiple plug socket with plugs and connectors positioned at each side thereof;

Figure 3 is an elevation showing the left-hand side of the structure illustrated in Figure 2, the conductors being omitted;

Figure 4 is a transverse sectional view of the structure shown in Figure 2 as shown along the lines 4—4 looking in the direction of the arrows;

Figure 5 is a central horizontal sectional view taken along the line 5—5 shown in Figure 4, looking in the direction of the arrows;

Figure 6 is an enlarged detail view, partly in section, showing the manner in which a prong is connected with a conductor;

Figure 7 is an end view taken along the line 7—7 shown in Figure 4, looking in the direction of the arrows;

Figure 8 is a top plan view, partly in section, illustrating a branch connector unit;

Figure 9 is a sectional view of the structure shown in Figure 8 as seen along the line 9—9, looking in the direction of the arrows;

Figure 10 is a central vertical sectional view of a miniature lamp socket embodying the features of the invention; and Figure 11 is a plan view of a blank for forming the segmental screw-threaded shell of the structure shown in Figure 10.

As is clearly shown in the drawing, the Christmas tree illumination system comprises a main line 1 formed of a cable of small dimensions embodying a pair of conductors 2, 3, and having a plug terminal 4 adapted to be connected to a standard type of transformer 5 preferably supplying low voltage such as, for example, 12 volts. The transformer is connected to a source of current by means of line 6 having a plug 7.

When it is desired to use 110 volts for the illumination system, the plug 4 is directly connected to the source of current in place of the plug 7, as will be well understood. The main line cable 1 is shown as provided with a series of multiple plug sockets 11, 12, 13, the socket 13 being provided with a suspension hook 14 whereby it may be engaged over a branch near the upper portion of the Christmas tree.

Inasmuch as each of the branch lines is engaged with a source of current at one of the multiple plug socket units, it is obvious that the first step in decorating a Christmas tree is to place the hook 14 adjacent the upper part of the tree and thus dispose the multiple plug sockets 11, 12, 13, at suitably spaced intervals along the trunk of the tree. This operation is conducted independently of the positioning of any branch lines of conductors and thus no interference with any ornaments already on the tree will take place. The placing of the lights about the tree, accordingly, will be an independent operation for each bulb and its associated conductor, and the artistic grouping of the lights or assembling the bulbs in suitable relation to other ornaments can be accomplished in a manner to produce the maximum decorative effect over the entire area. Thus, with the multiple plug conductors in place, the individual branch lines, for instance the line 15, can be plugged into the multiple socket 13 by means of the plug 16 and the bulb 17 in the socket 18 will thus be in direct connection with the circuit since the conductor 15 has two wires and thus completes a circuit to each bulb individually. As has been stated, the substitution of a number of bulbs connected in a series with a single plug such as the plug 16 may be substituted for the plug 16 and its associated parts so as to provide a cluster illumination of low voltage bulbs in the series line.

In most instances, individual bulbs of higher voltage than has been conventional in connection with Christmas tree lighting are now being used such as bulbs on a 110 volt circuit. When it is found desirable because of the density of the branching of the Christmas tree adjacent its lower area to provide a branch distribution point, then a connector unit 21 such as is shown in the lower part of Figure 1 may be used and bulbs may be permanently connected thereto by means of the lines 22, 23, and may also have individual plug-in connections such as is shown in the line 24 connected by means of the plug 25 with unit 21.

The construction of the several units of the illumination system is shown in Figures 2 to 11 of the drawing, Figures 2 to 5 relating to the multiple plug socket and connections, Figures 6 and 7 to the prong connection and clip, respectively, Figures 8 and 9 to the branch connector unit, and Figures 10 and 11 to the miniature lamp socket. As has been indicated, the conductor cable 1 runs in unbroken continuity throughout the multiple plug sockets 11, 12, 13, the individual wires 2, 3, being stripped of insulation within the socket area. As is more clearly shown in Figure 5, each multiple plug socket is formed of a body member 31 and a companion body member 32 in the form of elongated blocks of insulating material and their adjacent faces are formed with longitudinal grooves 33, 34 in parallel spaced relation extending over almost the full length of the block, said grooves connecting at each end with the terminal recesses 35, 36, within which the main line cable 1 is received through the openings 37, 38, respectively, centrally of the ends of the combined body members.

The body members 31 and 32 are held in permanent contact with each other by means of rivets 39, 40, or similar fastening means. The grooves and recesses are formed in each of the adjacent faces of the members 31, 32, so that the wires 2, 3, will be firmly engaged in the grooves and so that the main line cable 1 will have its insulated portion adjacent the multiple plug socket at each end housed within the respective terminal recess of the multiple plug socket which receives the stripped wires in the body portion of the socket after the insulation of the main conductor cable has been stripped therefrom.

Each of the members 31, 32, of each of the multiple plug sockets adjacent the longitudinal grooves or recesses 33, 34, therein is provided with a series of pairs of transversely disposed openings 41 of somewhat larger diameter than that of the contact prongs to be projected thereinto. The pairs of openings 41 in one member are staggered in relation to those in its companion member as shown in Figure 2 of the drawing. Each of the larger recesses is continued into the intermediate space of the companion member in the form of a narrower recess 43 into which the outer end portion of the adjacent contact prong snugly extends after it has made contact with one of the stripped conductor wires 2, 3, positioned in the channels of the members 31, 32.

The plugs 16 and sockets 18 of the individual lines 15 are each of the solderless type. The plugs 16 must have contact prongs which snugly engage within the narrow recesses 43 after they contact the stripped conductor wires, as stated. Such prongs are preferably formed of cylindrical contact elements 45 having fixed collars or circular enlargements 46 in spaced relation to one end, adapted to be received in suitable recesses in the plug body presently to be described. The end 47 of the contact prong adjacent the collar is open so as to receive a stripped conductor wire 48 of the line 15, and have crimped engagement therewith by suitably clamping the wall of the tubular member upon the wire. The opposite end 49 of the prong is rounded so as to cooperate with the recesses in the members 31 and 32.

The prongs, after engagement with the respective wires of the line 15 are received in parallel recesses 51 in the complementary halves of the body of the plug 16. The recesses are especially shaped to receive the enlargements 46 which serve to hold the prongs firmly in position as they project beneath the base of the plug. The plug thus is a solderless unit secured to one end of the line 15 and at the other end of said line a solderless socket 18 is provided within which is engaged a miniature lamp bulb 17. A detailed structure of the socket will be presently described.

The branch connector unit 21, is illustrated in Figures 8 and 9, and permits the current to be distributed from points spaced away from the main line 1 along the trunk of the tree, thus reducing the length of the individual lines 24 which may be required with the lower more heavily branched area of the tree. As stated, each unit 21 may also have one or more permanently attached branch lines or extensions 22, as shown in Figure 1.

The branch connector unit 21 is formed of insulating material and may receive current through a line 20 connected with one of the multiple plug sockets and received at its free end within an annular recess 51 provided between the unit halves which are firmly held together by means of a central rivet 52, which also passes through a central clamping block 53, having recesses adjacent the rivet shank into which shallow bosses 54, 55, centrally of the enlargements 56, 57, of the inner walls of the unit engage. The enlargements are each provided with small recesses adjacent the conductor line 20 to receive the inturned ends of the stripped wires 58, 59, and hold them in firmly engaged solderless connection with the respective current distributing disks 61, 62. The disks 61, 62, as shown in Figure 9 are of annular shape and are engaged over the respective shallow bosses 54, 55, which center them within the unit and anchor them securely to provide for frictional contact with the prongs of an individual line plug 25. To provide for easy contact with the disks 61, 62, the margins of the disks have portions 63 which are flared toward the adjacent walls of the unit providing a contact rib 64 on the inward marginal areas against which the prongs of the plug 25 engage to complete the circuit.

As has been indicated, permanent lines 22, may be connected with the unit or a large number of individual plug connections may be provided for in the manner shown in Figure 8. When the permanent lines are attached to the respective disks the manner of forming the contact will be substantially identical with the connection of the inturned ends of the stripped wires 58, 59 of the conductor line 20.

The effect of the illumination system on the ornamental effect of the tree decoration is of outstanding character, as the substantially complete concealment of the conductor lines prevents any diversion of the attention away from the purely artistic features of the assembled elements as a unitary design.

As stated, the entire system is formed without the use of solder or the like and each of the miniature lamp sockets 18, preferably is formed as shown in Figures 10 and 11. The body 71 of the lamp socket is in the form of an elongated cup, preferably of insulated material having a flared open end 72 and a bottom portion 73 of inverted frusto-conical cross-section, provided with a central opening 74 to receive the conductor cord 15. The side wall of the socket is of somewhat greater thickness adjacent the bottom portion to provide a snug fit against the stripped connecting wire 75 when the internal contacts are assembled with the body. A beveled annular shoulder 76 is formed at the point where the thickened portion of the side wall merges with the main portion thereof. A shallow groove 77 is formed around the inner surface of the socket closely adjacent the flared open end, and serves as a means of positioning the screw-threaded segmental contact shell 78.

The contact shell 78 is formed of a blank of sheet brass or other suitable conducting material of the general outline, shown in Figure 11, wherein a central annular area 81 joins two elongated rectangular areas 82, 83. These elongated areas are shaped to conform to the inner cylindrical wall of the body 71 when bent toward each other and are impressed to provide fractional screw-threads 84 into which the base of a miniature lamp may be screw-threadedly engaged when the parts are assembled as shown in Figure 10. The free edges 86, 87 of the rectangular areas of the blank are flared outwardly a slight distance greater than the internal diameter of the body and due to the character of the metal, which may be spring brass, will snap into the recess or shallow groove 77 and be firmly held therein, the convolutions of the threaded areas closely engaging the internal surface of the side wall and contacting the annular shoulder 76.

Before inserting the contacts within the body of the socket, a disk 91 of insulating material is placed above the annular area 81 of the contact shell, said disk having a central contact button 92 of tubular conducting material with a spun top edge and located in place on the disk by a transverse crimped portion 93 on the opposite side where it is clampingly engaged upon the end of a conductor wire 94. The other wire 75 of the circuit line 15 is engaged in the form of a terminal hook 95, through an aperture 96 in the adjacent half of the conductor shell 78 and is received in a shallow recess 97 formed on the edge of the disk 91, when the parts are assembled, being firmly held in position by contact with the heavier wall area near the base of the socket. The shell 78 has ample clearance from the contact button 92, provided by the relatively large opening 98 centrally of the annular area 81. When assembled all the parts seat firmly in position and are dependable in operation. The parts are also very easily accessible for inspection and repair.

It will be noted that the system of illumination for Christmas trees is not of a character to make the present type bulbs unusable, since bulbs of low amperage may be used in the circuit, thus permitting a user having the conventional type of series bulb to employ the double conductor system with individual bulb connection to the source of current and continue the use of such low amperage bulbs on a line supplied from a suitable transformer providing a voltage of approximately 12 volts. This system thus permits the use of substantially any type of bulb, the connection being made directly with the source of current for systems using 110 volts with the bulbs connected in parallel, or at any reduced voltage, the bulbs also in every instance being connected in parallel except when a string of series bulbs is used in one socket to connect on a line having 110 volt current.

Through the use of the parallel system of connection, whether of the 110 volt or the 12 volt type, any lamp which burns out will not affect any of the other lamps in the system and replacement may be carried out without an extended series of tests.

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

An illumination system for Christmas trees and the like having, in combination, a pair of parallely related continuous wires formed of conducting material corresponding ends of which are adapted to be connected to a source of electric current supply, spaced portions of said wires throughout their length being covered with sections of insulation material, respectively, enclosures for said wires between the adjacent end portions of adjoining insulation sections, each said enclosure consisting of a pair of elongated, connected together members formed of insulation material, the opposed faces of said members being formed with parallelly related longitudinally extending grooves for said wires terminating at their opposite ends in enlarged recesses and openings in the outer end walls of said recesses, the terminating end portions of adjacent insulation sections extending through said openings and into said recesses, the walls of said openings having snug engagement with the insulation material on said insulation sections to close said recesses and one of said members being formed with pairs of through openings disposed transversely of said member and arranged to received the prongs of outlet plugs to effect engagement of the prongs with said wires, respectively, and a device connected to the opposite corresponding ends of said wires and adapted to detachably engage an elevated portion of a tree, whereby said wires and the enclosures thereon may be suspended.

JOHN R. WOOD.

REFERENCES CITED

The following references are of record in the file of this patent:

UNITED STATES PATENTS

| Number | Name | Date |
|---|---|---|
| 1,891,341 | Barocas | Dec. 20, 1932 |
| 1,914,583 | Seghers | June 20, 1933 |
| 2,003,622 | Bateholts | June 4, 1935 |
| 2,090,501 | Neill | Aug. 17, 1937 |
| 2,219,568 | Stewart | Oct. 29, 1940 |
| 2,242,597 | Quandee | May 20, 1941 |
| 2,402,578 | Rollow | June 25, 1946 |
| 2,402,766 | Moore | June 25, 1946 |